(12) United States Patent
Pitwon

(10) Patent No.: US 9,333,717 B2
(45) Date of Patent: May 10, 2016

(54) METHOD OF MAKING A WAVEGUIDE AND A WAVEGUIDE MADE THEREBY

(75) Inventor: Richard Charles Alexander Pitwon, Fareham (GB)

(73) Assignee: Xyratex Technology Limited, Havant (GB)

( * ) Notice: Subject to any disclaimer, the term of this patent is extended or adjusted under 35 U.S.C. 154(b) by 1426 days.

(21) Appl. No.: 12/368,804

(22) Filed: Feb. 10, 2009

(65) Prior Publication Data

US 2009/0202713 A1 Aug. 13, 2009

Related U.S. Application Data

(60) Provisional application No. 61/028,297, filed on Feb. 13, 2008.

(51) Int. Cl.
| | |
|---|---|
| B29D 11/00 | (2006.01) |
| G02B 6/122 | (2006.01) |
| G02B 6/138 | (2006.01) |
| G02B 6/12 | (2006.01) |

(52) U.S. Cl.
CPC ........ B29D 11/00682 (2013.01); G02B 6/1221 (2013.01); G02B 6/1228 (2013.01); G02B 6/138 (2013.01); G02B 2006/121 (2013.01); G02B 2006/12069 (2013.01)

(58) Field of Classification Search
CPC .... G02B 6/1221; G02B 6/1228; G02B 6/138; G02B 2006/121; G02B 2006/1206; B29D 11/00682

USPC ............ 427/163.2; 264/1.1, 1.24, 1.27, 1.36, 264/1.38, 1.7

See application file for complete search history.

(56) References Cited

U.S. PATENT DOCUMENTS

| | | | |
|---|---|---|---|
| 4,133,620 A | 1/1979 | Lehner | |
| 5,429,489 A | 7/1995 | Geyer | |
| 5,498,444 A * | 3/1996 | Hayes | ............ 427/162 |
| 6,555,288 B1 * | 4/2003 | Xu | .......... C08F 22/18 |
| | | | 430/270.1 |
| 7,039,289 B1 | 5/2006 | Mendoza et al. | |
| 7,046,879 B2 * | 5/2006 | Kapusta et al. | ................ 385/43 |
| 7,086,846 B2 | 8/2006 | Kleinmeyer et al. | |
| 7,200,313 B2 * | 4/2007 | Kuroda et al. | ................ 385/132 |
| 2002/0012501 A1 * | 1/2002 | Tang et al. | ...................... 385/43 |
| 2005/0087896 A1 * | 4/2005 | Ohtsu | .................... G02B 6/138 |
| | | | 264/1.27 |
| 2005/0264811 A1 * | 12/2005 | Bi et al. | ...................... 356/338 |

FOREIGN PATENT DOCUMENTS

WO WO 95/23037 8/1995

\* cited by examiner

*Primary Examiner* — Mathieu Vargot
(74) *Attorney, Agent, or Firm* — Mueting, Raasch & Gebhardt, P.A.

(57) ABSTRACT

A method of making a waveguide, the method including depositing discrete units of optical core material in a pattern of the waveguide, and controlling the refractive index of the discrete units such that the refractive index of the waveguide varies along its length.

13 Claims, 21 Drawing Sheets

Diffusion of deposited polymer

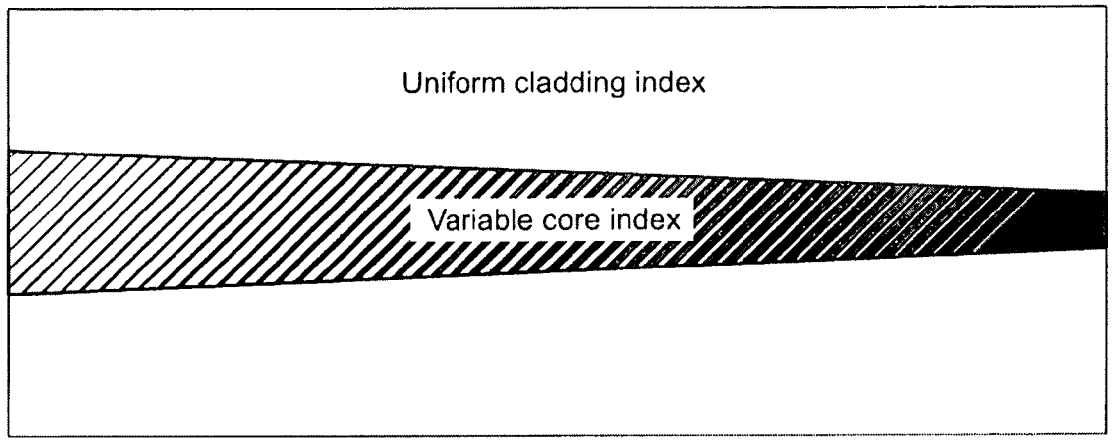
Fig. 1A: Refractive index conditions of core and cladding to implement lossless optical taper Uniform cladding index
Core index n2
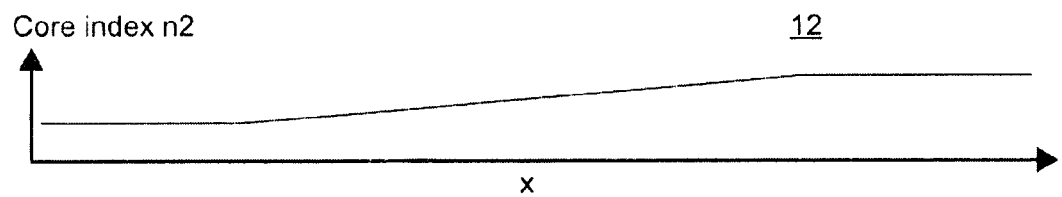
12
Cladding index n1
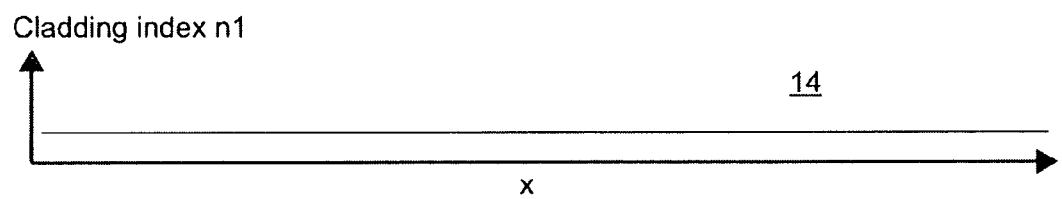
14
Delta (n2 - n1)
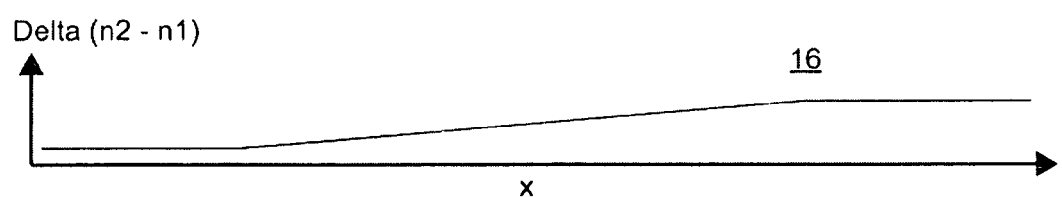
16
Fig. 1B: Refractive index conditions of core and cladding to implement lossless optical taper

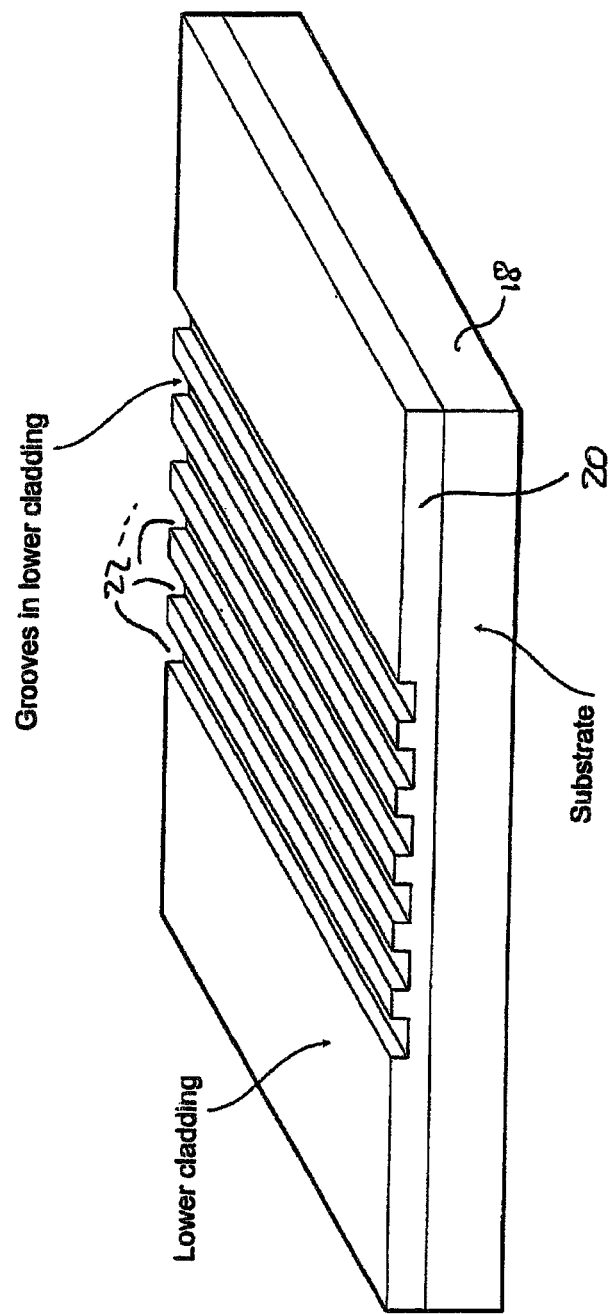
Figure 2: Grooves fabricated in cladding layer

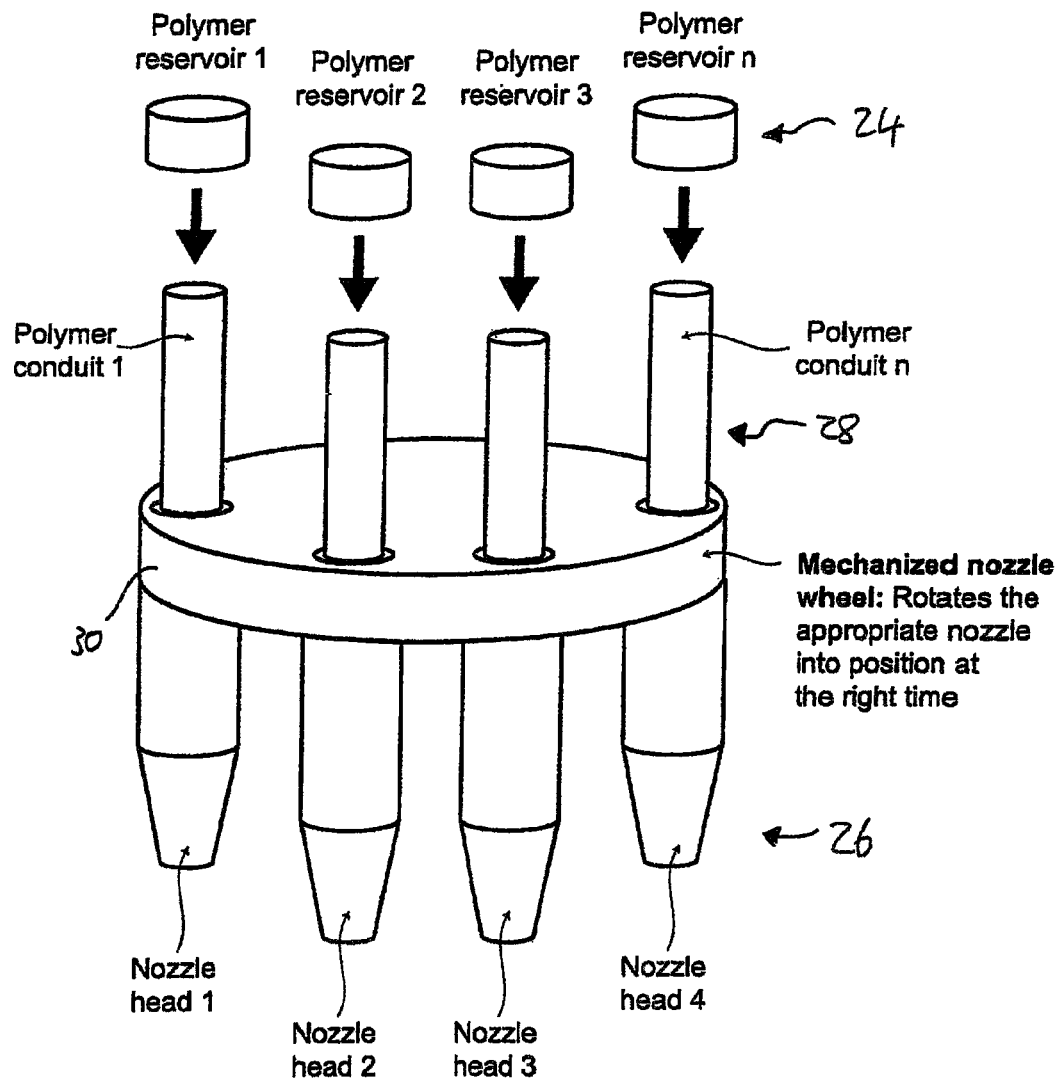
Figure 3: Multiple nozzle polymer dispenser (schematic representation)

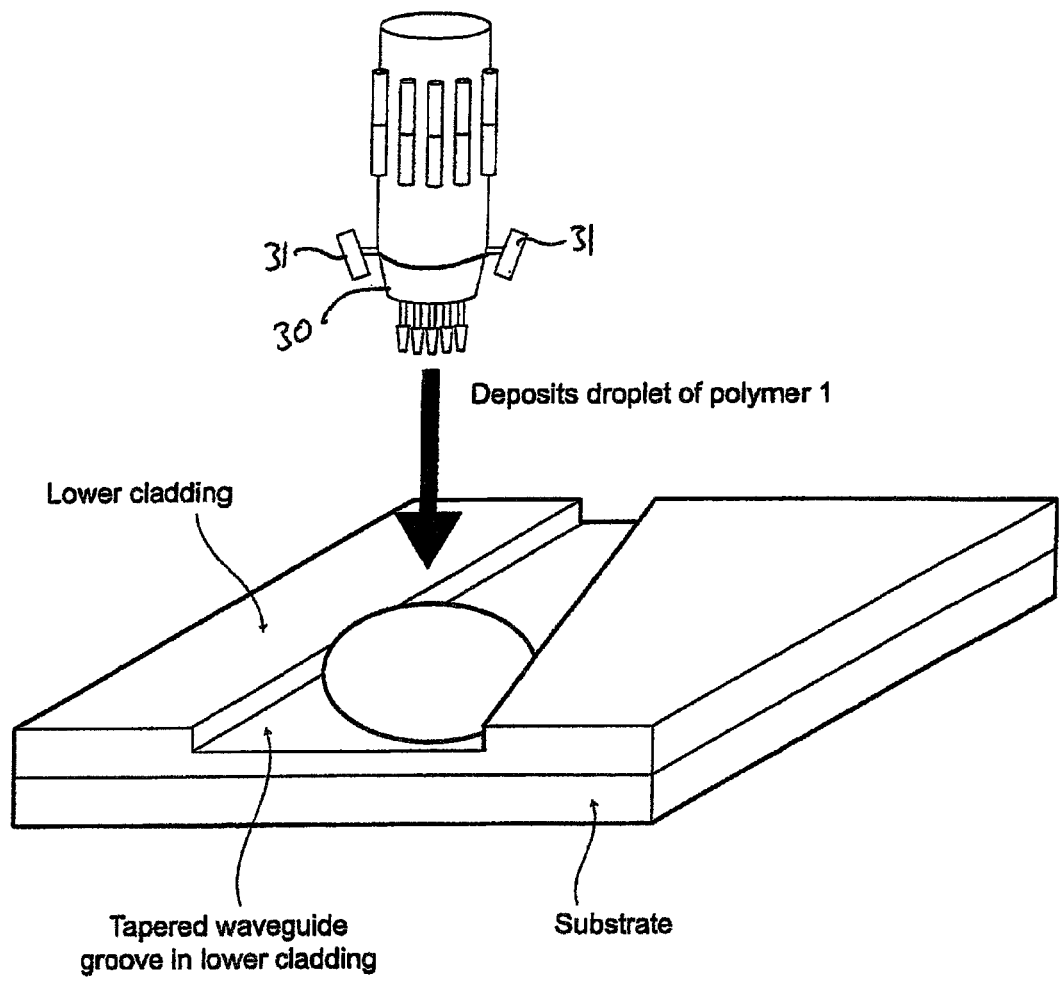
Figure 4: Deposition of first droplet into tapered groove

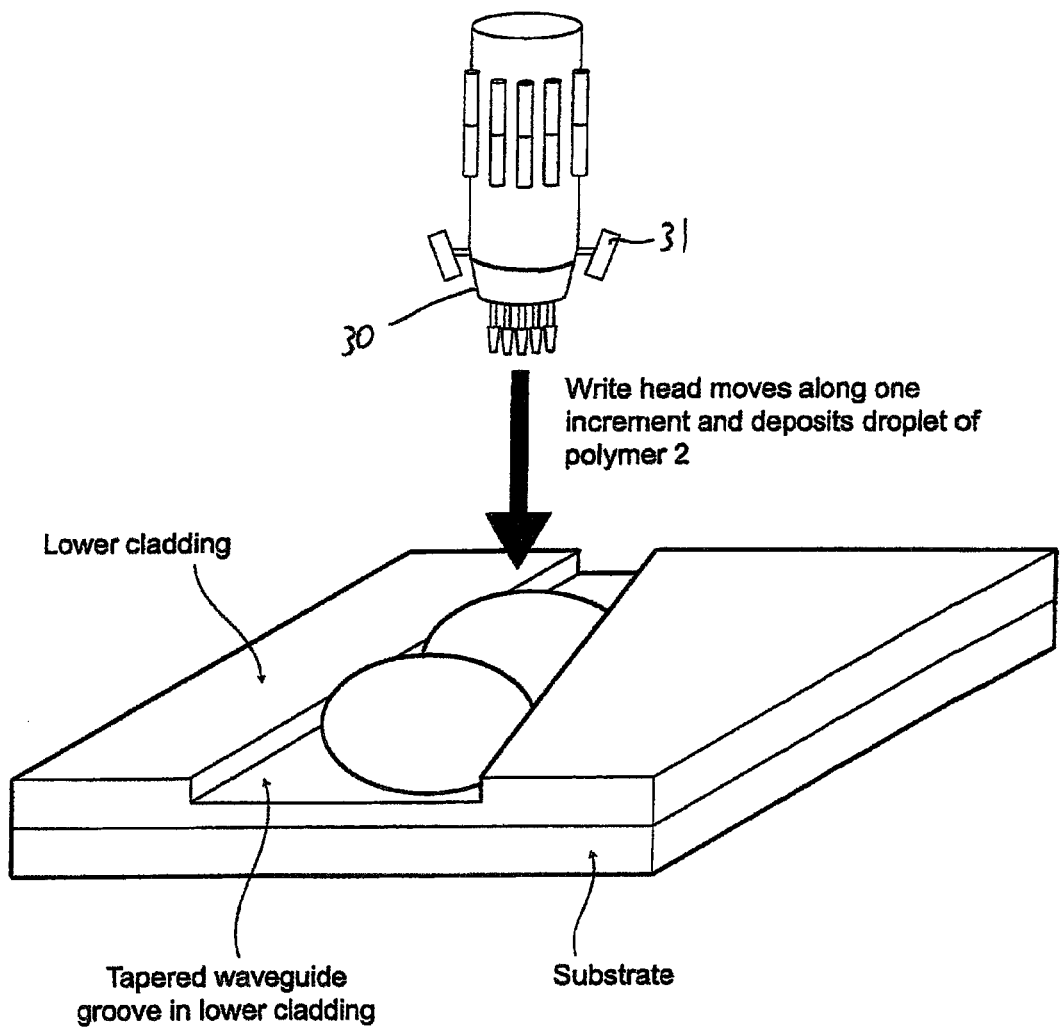
Figure 5: Deposition of adjacent droplet into groove

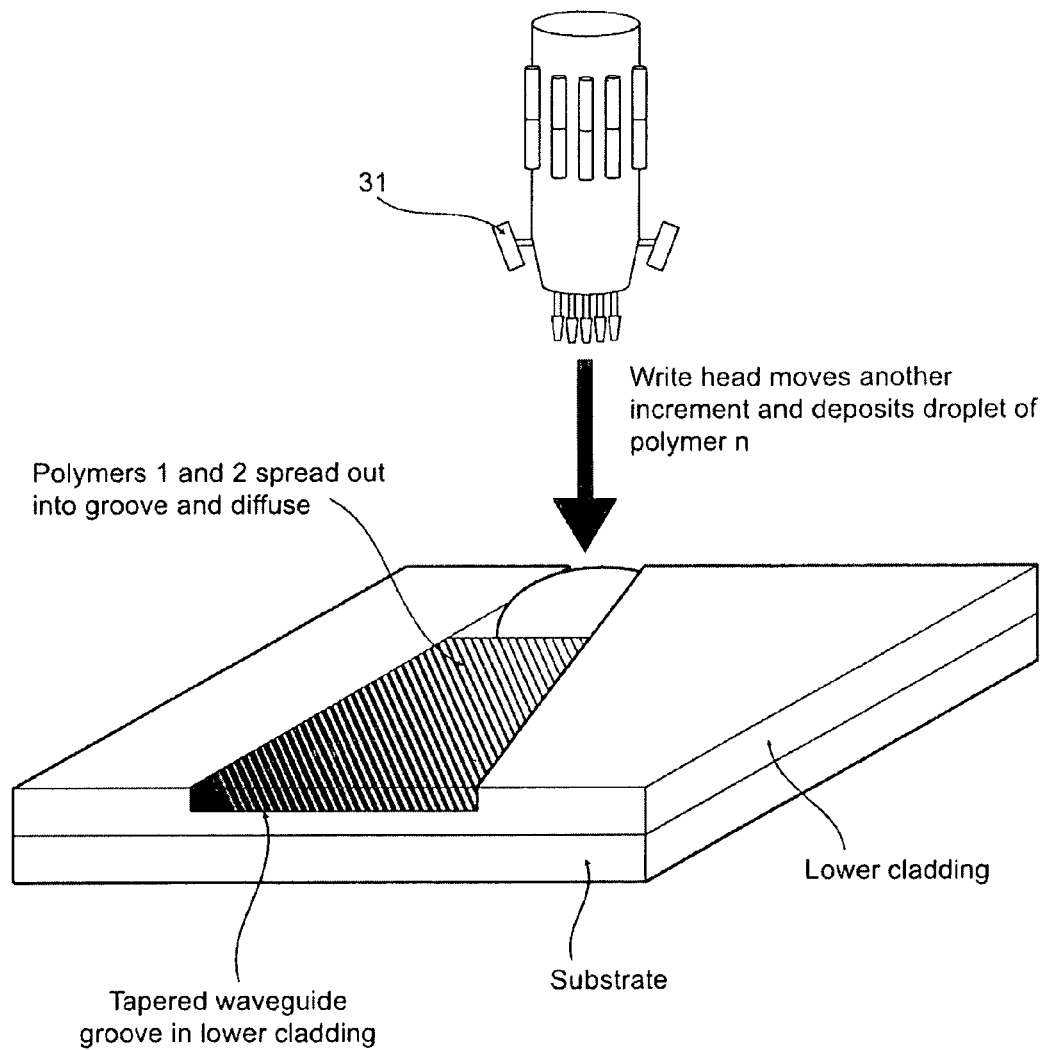
Fig. 6: Diffusion of deposited polymer

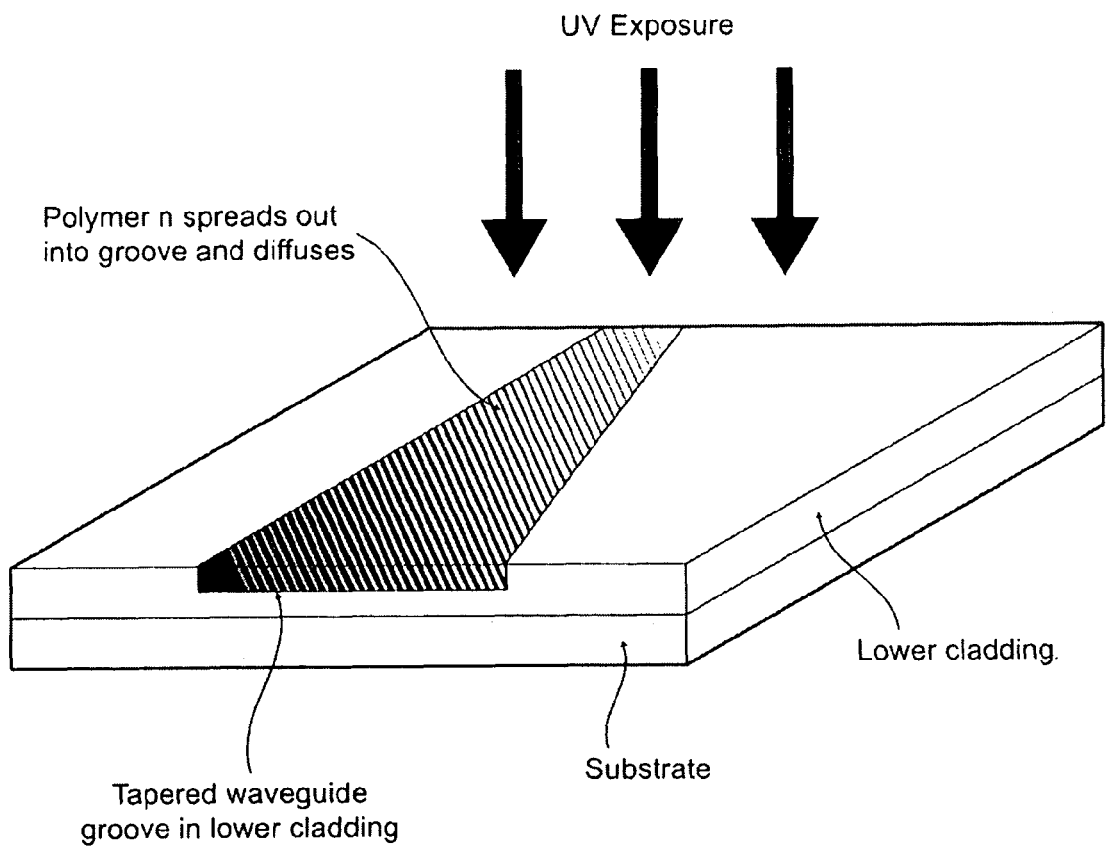
Fig. 7: Controlled UV exposure to cure graded refractive index core

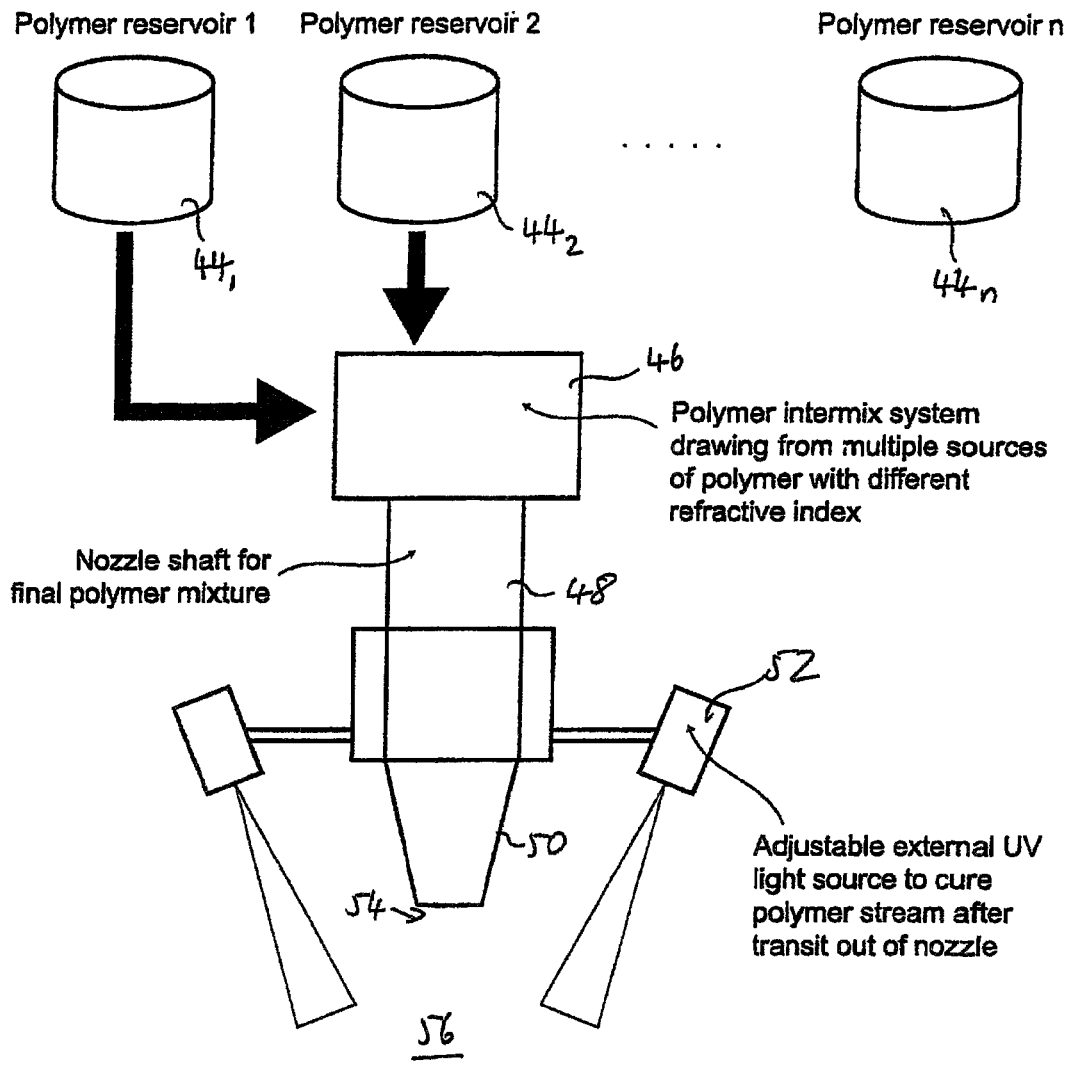
Figure 9: Polymer dispenser with multiple (n) polymer reservoir sources, intermix system (prior art cited) and UV cure elements

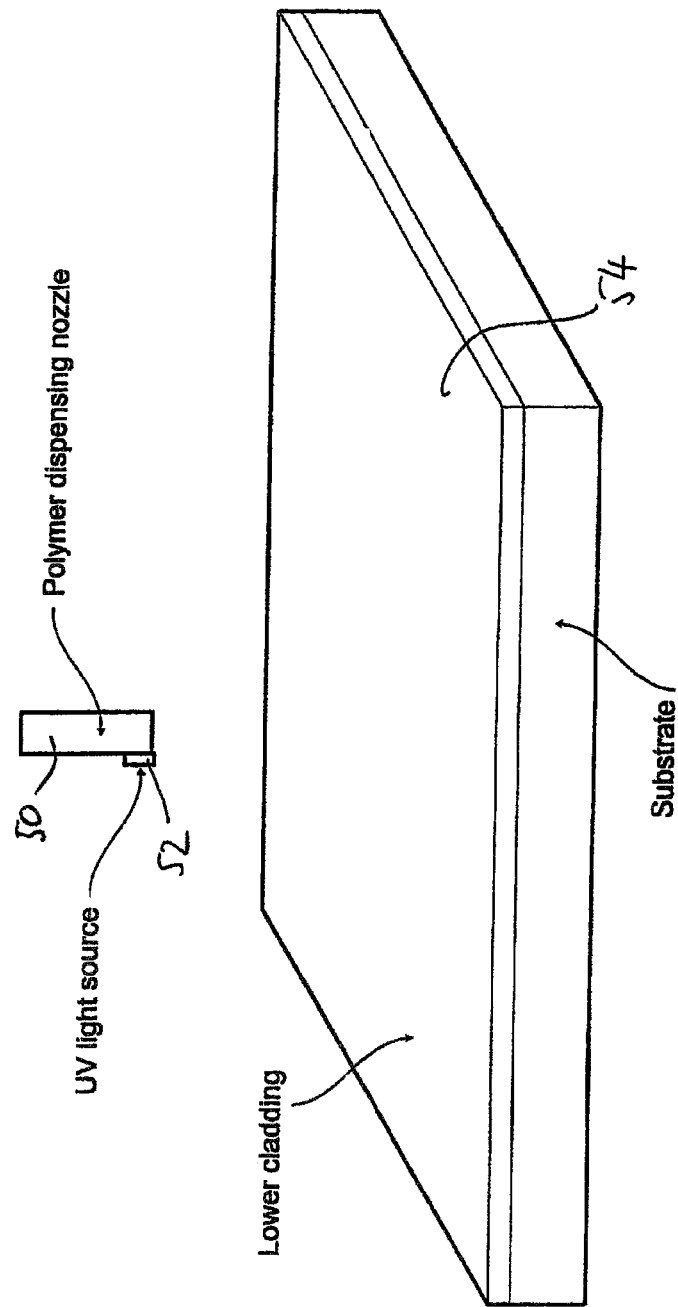
Figure 10: Position polymer dispensing nozzle in preparation for waveguide fabrication

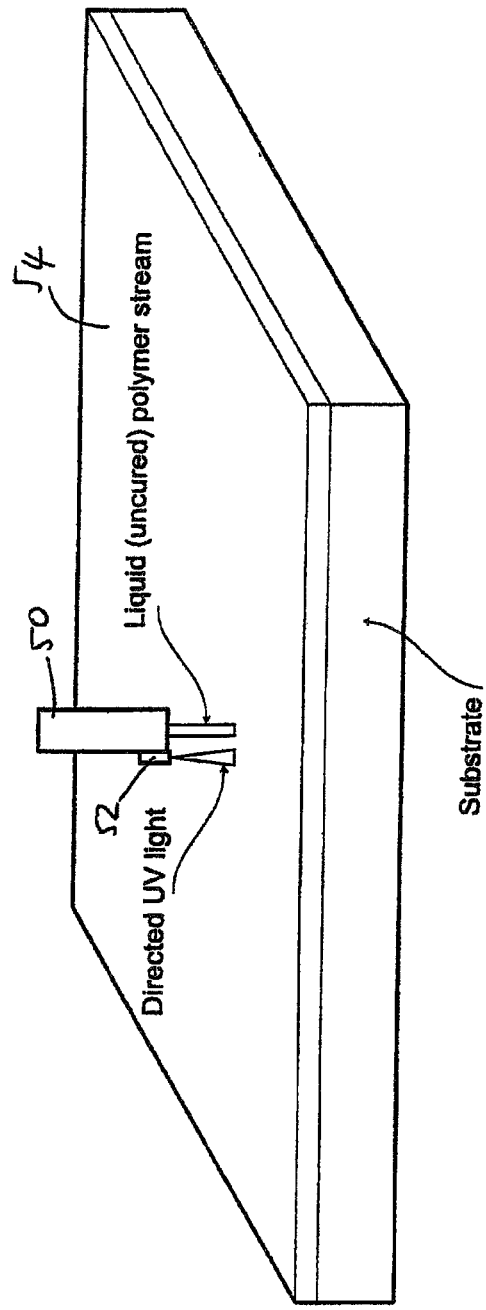
Figure 11: Activate nozzle to dispense liquid (uncured) polymer and activate UV light source to immediately (partially) cure polymer in a controlled fashion

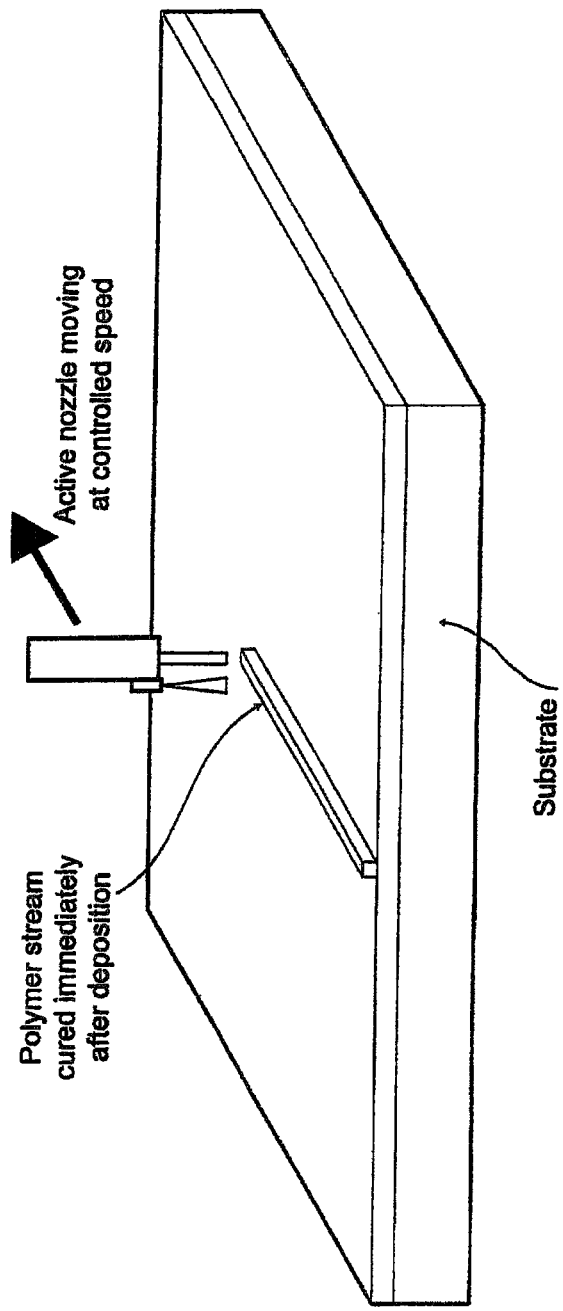
Figure 12: Polymer deposition and curing commences forming stable rigid waveguide

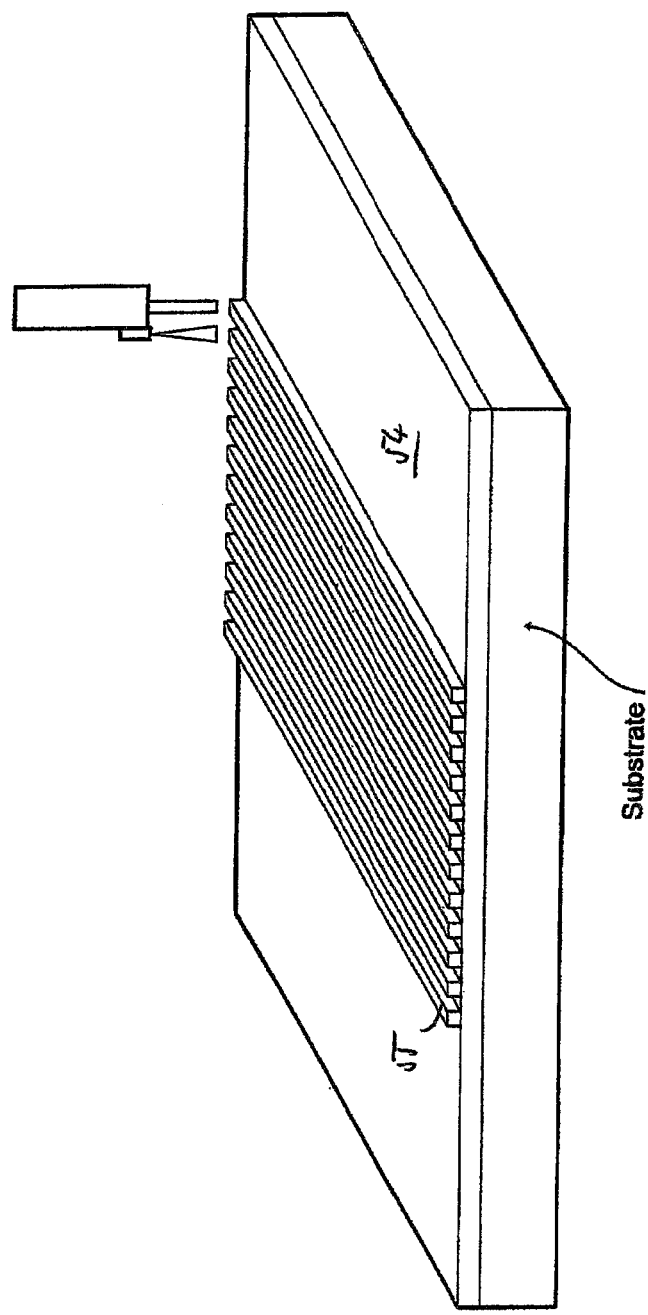
Figure 13: Completion of waveguide fabrication process

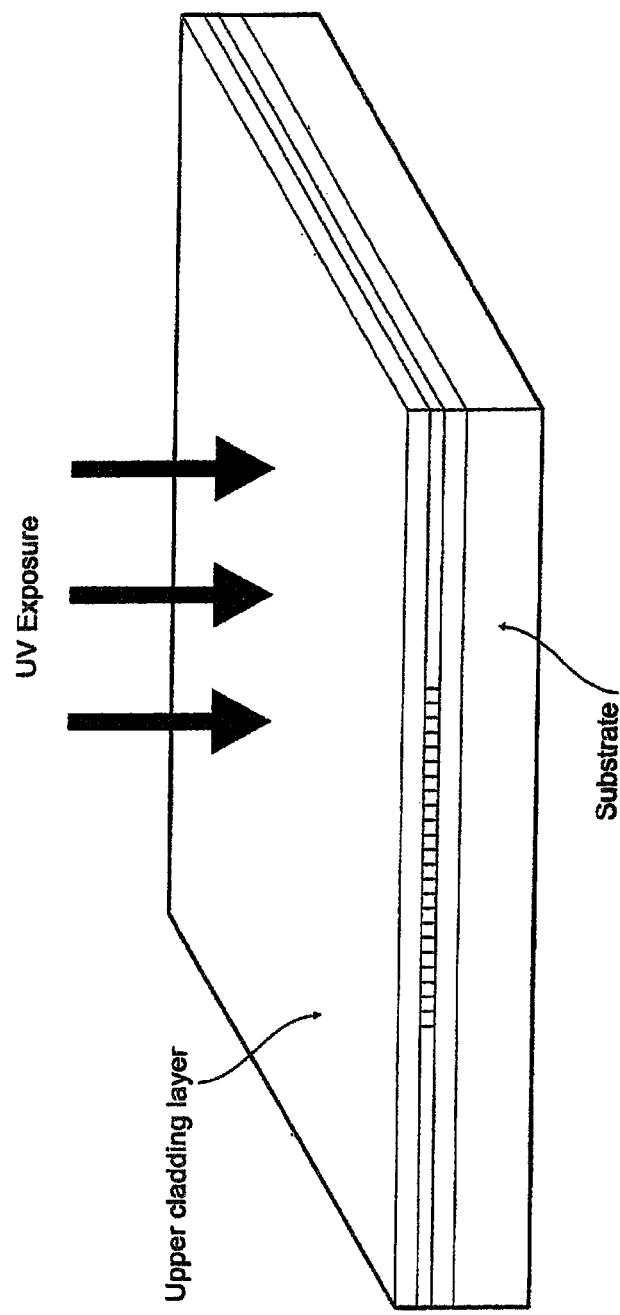
Figure 14: Deposition and curing of upper cladding layer

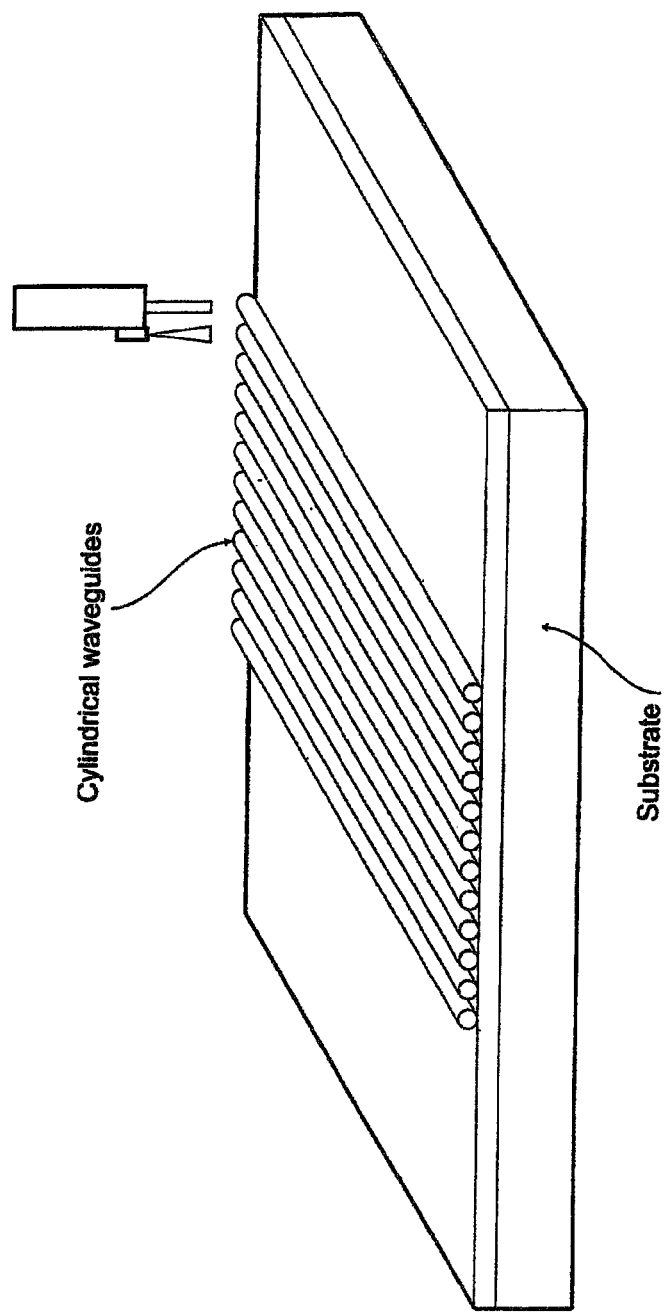
Figure 15: Deposition of cylindrical waveguides

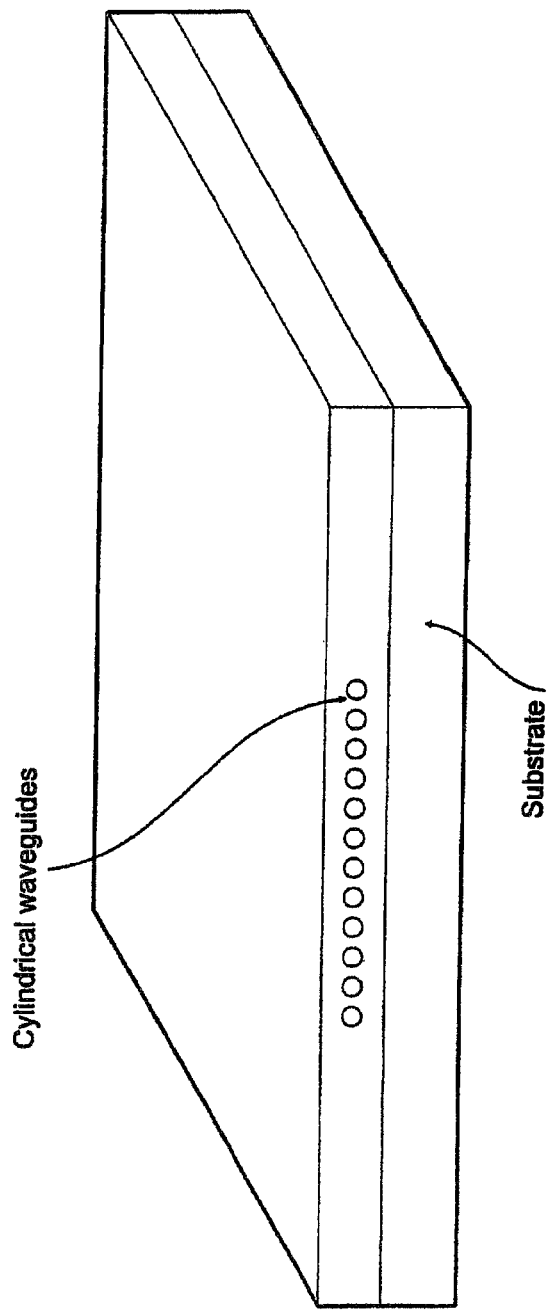
Figure 16: Optical PCB with cylindrical waveguides

METHOD OF MAKING A WAVEGUIDE AND A WAVEGUIDE MADE THEREBY

CROSS REFERENCE TO RELATED APPLICATIONS

The present invention claims priority under 35 U.S.C. §119 (e) to U.S. Provisional Application Ser. No. 61/028,297, filed on Feb. 13, 2008, titled "A METHOD OF MAKING A WAVEGUIDE AND A WAVEGUIDE MADE THEREBY", the content of which is incorporated herein in its entirety be reference.

FIELD

The present invention relates to a method of making a waveguide and to a waveguide made by the method. The invention also relates to an optical printed circuit board including a waveguide.

BACKGROUND

As required data rates increase in computers and data switches and the like optical signal carriers are being used in place of or as well as conventional copper signal carriers. Optical printed circuit boards (PCBs) have optical waveguides that are used for the transmission of light signals between components, as well as or instead of conventional copper conductors. Typically, an optical PCB consists of a base or support layer. In areas of the optical PCB where optical waveguides are required, a lower optical cladding layer is provided usually of uniform thickness. On top of this, a layer of optical core material is laid down. The optical core material has a higher refractive index than the cladding layer and will eventually form one or more optical waveguides on the optical PCB.

In a known process used for making optical PCBs, the core layer is laid down in liquid form, e.g. as a curable liquid polymer. A mask having openings corresponding to the desired shape of the waveguides is arranged over the liquid polymer and the entire resultant structure is then irradiated with electromagnetic radiation of suitable wavelength. Thus, in regions of the mask which are open, the liquid polymer is cured. In other regions, the polymer remains liquid. The mask is removed and the remaining liquid polymer can be washed away leaving the desired pattern of optical waveguides.

The remaining core material is typically arranged in patterns of channels which are arranged in some manner so as to be able to couple optical signals between components on the optical PCB when the components are arranged thereon. Last, an upper cladding layer is laid down, so that the channels of core material are completely surrounded by cladding material, and therefore are able to function as optical waveguides. Waveguides can guide light even if surrounded by air, because air has a lower refractive index than the core material. It is preferable that core waveguides are surrounded by a material of uniform refractive index, so there is no asymmetry in boundary conditions on some facets.

Tapered optical waveguides are known. See, for example, the disclosure of U.S. Pat. No. 7,039,289, discussed in detail below. Typically in a tapered waveguide at the ingress end, i.e. the end at which light is launched into the waveguide, the waveguide diameter or rather the area of the input interface depending on waveguide cross-section is made as large as possible to allow for misalignment of the light source with the input interface. In contrast, at the egress end, at which light which has propagated through the waveguide is launched into an optical receptor, e.g. a lens, photodiode, optical fibre etc, waveguide diameter or rather the area of the output interface depending on waveguide cross-section is made as small as possible to maximise the amount of light caught by the receptor.

As light propagates along a tapered waveguide significant signal loss can occur due to modal expulsion which occurs since the number of optical modes that can be supported by a waveguide is dependent in part on the boundary conditions of the waveguide. The larger the cross-section area, the higher the number of modes that can be supported. Therefore as the cross sectional area decreases along the taper, the number of modes that can be supported decreases correspondingly.

To address this it has been suggested that the refractive index of the optical core of the waveguide be changed to compensate for the modal expulsion due to the varying diameter. It is known that the number of supported modes also depends on the refractive index difference between the waveguide core and its cladding. Therefore, in theory, modifying the refractive index of the core along the length of a tapered waveguide should be able to ensure that modal expulsion is minimised or even eliminated.

WO-A-95/23037 discloses a method and apparatus by which micro-optical components can be printed directly onto an optical substrate or an active device to create optical circuit elements as well as micro-optical components such as lenses and waveguides. The method provides a means for depositing a wide range of materials in a wide variety of shapes for fabricating a range of passive and active micro-optic devices. As shown in and described with reference to FIG. 9, a waveguide can be formed by dropping a plurality of drops of optical material in a desired pattern.

U.S. Pat. No. 7,039,289 discloses a process for fabricating integrated optics devices. A photosensitive sol-gel glass material including a volatile photosensitiser is prepared and a film of the material is laid down prior to patterning to form a desired device by exposure to curing radiation. A variety of passive and active integrated optic devices may be manufactured using the disclosed method. One example is a tapered waveguide. With reference to FIG. 31 of this document it is disclosed that to maintain the number of propagation modes within the tapered waveguide, the refractive index of the expander is decreased as its width increases.

A problem with the disclosed method is that it is extremely complex and relies on the use of glass which can be difficult to work with. A simple and reliable method of producing a waveguide, such as a tapered waveguide, is required. When used herein the term "tapered waveguide" refers to a waveguide having a tapered optical core or the tapered core itself.

SUMMARY

According to a first aspect of the present invention, there is provided a method of making a waveguide, the method comprising: depositing discrete units of optical core material in a pattern of the waveguide, selecting the refractive index of the discrete units such that the effective refractive index of the waveguide varies along its length.

By using discrete units of optical core material it is possible simply to control the variation of refractive index along the length of the waveguide. In particular, where an optical polymer is used the discrete units may be deposited by an inkjet system whereby liquid droplets are deposited, the refractive index of the droplets being variable so that the refractive index of the resultant waveguide can be controlled along its length.

By using a simple deposition technique in which discrete units of optical material are deposited so as to control the refractive index variation of the waveguide along its length, complex solutions, such as ion exchange, available for producing loss-loss tapers in waveguides can be avoided. The method provided herewith is compatible with mass-production processes and is less expensive. In addition, inkjet deposition techniques can be used to deposit the optical core material.

Preferably, the waveguide to be made is a tapered waveguide and the refractive index of the tapered waveguide is controlled to vary along its length so as to minimise modal expulsion as the cross sectional area decreases along its length. More preferably, the variation in refractive index is controlled by the selection and deposition of droplets having desired refractive indices such that the aggregate refractive index varies along the length of the tapered waveguide to a desired profile.

Preferably, the step of controlling the refractive index of the discrete units comprises mixing two or more components of optical core material of different refractive indices to produce a discrete unit of optical core material having a refractive index dependent on the refractive indices of the components and/or the proportions in which they are mixed.

Thus by mixing two or more optical materials, e.g. a high and a low refractive index material, and by varying the proportions thereof a resultant material can be achieved having a refractive index at any desired level between the refractive index of the high refractive index source material and the refractive index of the low refractive index material. A substantially continuous range of refractive index is therefore achievable of the resultant material by providing only two source materials. This ensures that both the method of manufacture and the apparatus can be very simple indeed since no more than two sources are actually required to achieve a continuous range of available refractive indices for the resultant material to be deposited.

Preferably, the discrete units of optical core material are liquid droplets of optical polymer material.

In one example, the deposited discrete units of optical core material are left for a period of time prior to hardening so as to allow diffusion between discrete units to smooth out refractive index differences at the boundaries of the discrete units. Typically a waiting period of between 10 seconds and 10 minutes might be used depending on the size of the discrete units, and surface tension properties of the material used.

Preferably, the method comprises, before, during or after the droplets have been deposited, curing the droplets with curing radiation. By selecting the time delay and duration of curing the tackiness of the optical material and its ability to diffuse etc can be controlled so that the structure of the resultant waveguide being formed can be easily controlled.

Preferably, the method comprises providing a first source of a first optical material having a relatively high refractive index and a second source of a second optical material having a relatively low refractive index.

In a preferred example, the method comprises varying the proportion of discrete units of the first type with respect to the number of the second type deposited along the waveguide thereby to control variation in the refractive index of the waveguide along its length. In this example, no mixing is required of the two materials. By providing a varying proportion of droplets of the two source materials a resultant structure with a varying aggregate or bulk refractive index can be formed.

Preferably, the average diameter of each discrete unit is at least an order of magnitude less than the width of the waveguide. By making the individual droplet relatively small as compared to the dimensions of the waveguide the granularity is sufficiently small so as to ensure that even though there may be regions of localised high refractive index and low refractive index material, overall the desired refractive index profile for the waveguide can be achieved.

In a preferred example, the method comprises forming the waveguide on an optical cladding layer and providing an upper cladding on top of the waveguide once formed.

In a preferred example, the waveguide is a tapered waveguide having a tapered optical core and an optical cladding around the core, in which the refractive index difference between the cladding and the core material increases from a relatively thick end of the waveguide to a relatively narrow end.

In one example, the method comprises mixing the desired proportions of the first and second type of optical core material in a conduit between the source and the point of application to achieve a desired refractive index for each of the dispensed units.

In a preferred example, the method comprises, providing plural dispensers each containing a polymer with a refractive index different to all the others, the method comprising providing one or more discrete units from each of the dispensers to achieve a waveguide with a refractive index that varies along the tapered length.

According to a second aspect of the present invention, there is provided apparatus for forming an optical waveguide, the apparatus comprising a nozzle for dispensing discrete units of optical material from two or more sources of optical material of different refractive index; and a controller configured to control the nozzle to deposit discrete units of optical core material in a pattern of the waveguide, and to control the refractive index of the discrete units such that the refractive index of the waveguide varies along its length.

Preferably, the apparatus comprises a conduit for mixing optical material from the two or more sources to obtain a resultant material of desired refractive index for deposition to form the waveguide.

In a preferred example, the nozzle is sized to produce discrete units of optical material having a width at least an order of magnitude smaller than the width of the waveguide being formed. By sizing the nozzle so as to provide droplets that are relatively small as compared to the dimensions of the waveguide the granularity of the resultant waveguide is sufficiently small so as to ensure that even though there may be regions of localised high refractive index and low refractive index material within the waveguide, overall the desired refractive index profile for the waveguide can be achieved.

In one example, by mixing the two or more optical materials, a resultant material with continuous refractive index changes may be achieved. In this case, it is not necessarily the granularity of deposited droplets that provide the overall effective refractive index variation. The refractive index variation is directly applied in the units of optical material which can be even as large as the waveguide as long as the refractive index difference from one droplet to another is sufficiently small along the taper.

In one example, there are only two sources of optical material of different refractive index, the refractive index of the material from one of the sources being higher than that of the other, wherein the controller is arranged to control the nozzle to dispense discrete units from each of the two sources in a desired proportion so as to achieve a desired variation in refractive index along the waveguide.

In another example, there are more than two sources of optical material each for containing optical material with a different refractive index.

In a preferred example, the apparatus comprises a radiation source arranged to irradiate the optical material before, during or after it has been dispensed from the or each nozzle. This enables accurate control of the point within a deposition cycle that curing occurs and corresponding accurate control of the tackiness of a droplet of material.

According to a third aspect of the present invention, there is provided apparatus for forming an optical waveguide, the apparatus comprising a nozzle for dispensing of optical material from two or more sources of optical material of different refractive index; a conduit for mixing optical material from the two or more sources to obtain a resultant material of desired refractive index for deposition to form the waveguide; and a controller configured to control the apparatus to deposit a continuous stream of optical material and to vary the composition of the stream during dispensing so as to determine variation in the refractive index of the waveguide as it is formed.

Preferably, the apparatus comprises a curing radiation source for irradiating the stream before, during or after it has been dispensed from the nozzle to at least partially cure the material before it is deposited on a substrate.

According to a further aspect of the present invention, there is provided a method of making an optical waveguide, the method comprising: mixing optical material from two or more sources to obtain a composition of mixed optical material of desired refractive index for deposition to form the waveguide; and dispensing a continuous stream of the mixed optical material to form the waveguide; and varying the composition of the stream during dispensing so as to determine variation in the refractive index of the waveguide as it is formed.

Preferably, the method comprises curing the stream with a radiation source prior to, during, or immediately after deposition.

The method preferably comprises varying deposition parameters to control the dimensions of the waveguide to be formed. The deposition parameters may be selected from the group including write head speed, nozzle aperture diameter, viscosity of deposited material, and angle and duration of radiation exposure time.

According to a further aspect of the present invention, there is provided apparatus for forming an optical waveguide, the apparatus comprising a nozzle for dispensing of optical material; two or more sources of optical material of different refractive index; a conduit for mixing optical material from the two or more sources to obtain a resultant material of desired refractive index for deposition to form the waveguide; and a controller configured to control the apparatus to deposit a continuous stream of optical material and to vary the composition of the stream during dispensing so as to control the refractive index of the waveguide as it is formed.

This enables real time deposition of a waveguide with continuously variable refractive index or refractive index difference as compared to its cladding. Relatively quick, cheap and easy manufacture of lossless tapered optical waveguides is therefore made possible.

According to a further aspect of the present invention, there is provided a method of making a waveguide, the method comprising: forming a layer of optical core material having a refractive index that varies in a direction along the layer; removing a first part of the layer to leave a second part having a taper with a relatively thick end and a relatively thin end arranged with respect to the layer such that the refractive index of the second part varies from the thick end to the thin end.

Thus, a method is provided by which a layer of optical core material is patterned using any convenient method to form a tapered optical waveguide. The layer is provided such that, in a direction along the layer, there is a desired variation in refractive index. This means that when a part of the layer is removed, leaving a tapered structure defining a waveguide core, the arrangement or "footprint" of the tapered structure is such that its refractive index varies along its length. A simple and easy to use method is provided by which a tapered waveguide can be created to minimise modal expulsion in use.

Preferably, an upper and/or lower optical cladding is also provided.

According to a further aspect of the present invention, there is provided a method of making a waveguide, the method comprising: forming a lower layer of optical material having a refractive index that varies in a direction along the layer; forming a tapered waveguide core on the lower layer, the core having a constant refractive index along its length; and forming on top of the core and lower layer, an upper layer of optical material having a refractive index that varies in corresponding manner to the variation of refractive index of the lower layer, such that the refractive index difference between the waveguide core and the upper and lower layers varies along the length of the taper.

BRIEF DESCRIPTION OF THE DRAWINGS

Examples of the present invention will now be described in detail with reference to the accompanying drawings, in which:

FIGS. 1A and 1B are schematic representations of a waveguide and the variation of refractive index along its length;

FIGS. 2 and 2A are schematic representations of an intermediate product in the manufacture of an optical PCB;

FIG. 3 is a schematic representation of apparatus for making an optical waveguide;

FIGS. 4 and 5 are schematic representations of the apparatus of FIG. 3 in use;

FIG. 6 is a schematic representation of the next stage of the process shown in FIG. 5;

FIG. 7 is a schematic representation of the next stage in the process after that shown in FIG. 6;

FIG. 9 is a schematic representation of apparatus for use in the manufacture of an optical waveguide; and FIGS. 10 to 18 show the steps in a method of making an optical waveguide on an optical PCB.

DETAILED DESCRIPTION

Figure 2A:
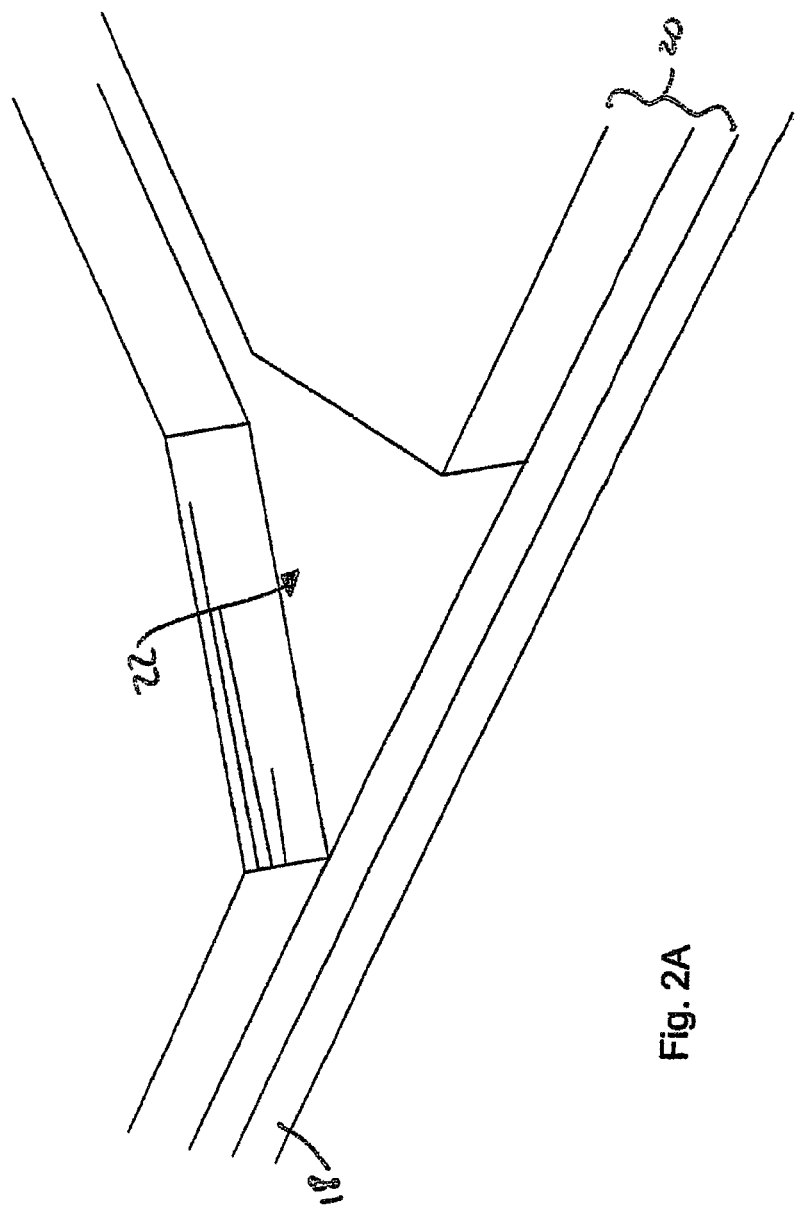

FIGS. 1 and 1A show a schematic representation of a tapered optical waveguide 2 having a core 4 and a cladding 6. The waveguide is a tapered waveguide in that it has an input end 8 which is larger in diameter or cross-section than its output end 10. To minimise modal expulsion of light signals propagating along the waveguide from the input end 8 to the output end 10, the refractive index of the core varies along the length of the waveguide. The variation of refractive index of the core is shown schematically in FIG. 1A by the graph 12.

The core index $n_2$ can be seen to increase from the input end 8 to the output end 10. Beyond the input and output ends 8 and 10 the value of the refractive index is constant. The cladding 6 of the waveguide is selected to have a constant refractive index $n_1$ which is shown in the graph 14. The graph 16 shows the relationship $n_2-n_1$ such that the value of $\Delta n$ can be seen to increase corresponding to the increase in the refractive index of the core $n_2$ along the length of the waveguide. An therefore varies correspondingly along the length of the waveguide.

FIG. 2 is a schematic representation of an intermediate product in a process for making an optical PCB including a tapered waveguide. The device includes a substrate 18 with a lower cladding 20 formed thereon. Groves 22 are formed in the lower cladding and will be filled with an optical core material to define the core of the waveguides. In the example shown in FIG. 2, the core of the waveguide to be formed is to be formed within the grooves of the substrate. Other configurations are possible. For example, instead of having a core formed within the lower cladding, patterning could be used on the substrate such as to define a region where core material will be confined when deposited without necessarily requiring an actual trench to be formed in a cladding material.

FIG. 2A shows an individual one of the grooves 22 with a taper to enable formation of a tapered waveguide therein.

The grooves for the waveguides may be fabricated in the lower optical cladding layer in any appropriate manner. A non-exhaustive list of possibilities includes the following:
  a) photo-lithographically whereby a mask is applied to the photosensitive polymer, which may be used in the curing of shapes such as grooves or trenches in the cladding areas, which when filled with core material would form the waveguides (in contrast to the norm where the waveguides themselves would be cured from a layer of core material). The cladding areas cured are therefore between the positions of the where the waveguides will be;
  b) laser writing whereby the same areas between waveguides are cured directly with a directional light source (UV laser);
  c) laser etching whereby the grooves are milled out of the lower cladding surface;
  d) hot or UV embossing of tapered grooves;
  e) reactive ion etching of tapered grooves and
  f) the use of dry film to delineate the grooves, which would then be filled with the core material and cured. The dry film is peeled away afterwards to reveal the cured waveguide structures which could then be covered in cladding as required.

The grooves define a physical taper as shown in FIG. 2A such that when they are filled with a core material, they form tapered waveguides.

FIG. 3 is a schematic representation of a nozzle wheel forming part of a write head for use in the manufacture of a tapered optical waveguide. As explained above, it is desired that the refractive index of the tapered waveguide varies along its length from the input end to the output end so as to minimise modal expulsion of an optical signal travelling from the relatively wide end of the waveguide to the relatively narrow end and vice versa. The apparatus of FIG. 3 is used for the deposition of optical core material within the groove 22 shown in the device of FIGS. 2 and 2A.

In the examples shown, a plurality of polymer reservoirs 24 are provided each in communication with a corresponding dispensing nozzle and nozzle head 26 via a respective polymer conduit 28. The polymer reservoirs 24 are each for containing a corresponding liquid polymer with a desired refractive index. The refractive indices of the respective polymers in the reservoirs 24 are different such that by dispensing from a selected one of the nozzle heads 26 a droplet of polymer with a desired value for its refractive index, corresponding to the selected reservoir, can be dispensed. In use, initially at a first end of the optical waveguide a first droplet of polymer from polymer reservoir 1 is deposited.

FIG. 4 shows a schematic representation of this step. In this example, the write head includes a mechanised nozzle wheel 30 which is rotated such that a desired one of the nozzle heads 26 is appropriately positioned over the groove in the lower cladding. It may be preferred that the nozzle head which is to be used for dispensing a particular drop is positioned above the central longitudinal axis of the groove. In another example the underlying structure including the groove 22 is moved and the nozzle head remains stationary. What matters is that there is relative movement or reconfiguration between the write head and the underlying structure such that a droplet can be deposited from a desired nozzle. Means for reconfiguring the write head other than a rotatable arrangement, may be provided.

Once in position, a droplet is deposited. Next, as shown in FIG. 5, the write head moves along a predetermined increment and deposits a droplet of polymer from polymer reservoir 2. Thus, by repeating these steps the refractive index of a formed waveguide is varied along the taper.

In FIG. 6, a droplet of polymer n is deposited. The polymers 1 and 2 spread out, being liquid, into the groove and also diffuse into each other at the boundary regions such as to achieve a relatively smooth variation in refractive index along the taper. Clearly, there will not be complete diffusion since it is actively desired that there is a variation in refractive index from the input end along the length of the waveguide. However, there is sufficient diffusion so as to provide some smoothing out of "steps" in refractive index value along the length. Parameters of the polymers and write head may be controlled to ensure that this is achieved, as discussed in detail below.

It will be appreciated that at any given point, the write head is required to deposit a droplet of a given refractive index. The system is controlled or controllable to calculate from which polymer reservoir 24 the droplet should be drawn at the given point and to configure the assembly such that the appropriate nozzle head 26 is in a depositing position. The nozzle head is then commanded to dispense a droplet of its polymer. An appropriately configured inkjet system can be used to dispense the polymer droplets.

FIG. 7 shows the process of deposition complete in that the groove 22 within the lower cladding is now full of polymer core material. The resultant waveguide polymer core is then exposed to ultraviolet radiation to harden the polymer material such that the required refractive index variation is present along the taper.

This method is particularly simple since there is no need to mix polymers during deposition. Indeed, instead of premixing the polymer, droplets of different polymers are deposited directly into a tapered groove. Adjacent droplets are then allowed to diffuse naturally as they fill the groove through gravity and surface tension. Once this has occurred they are cured, preferably by exposure to UV light. Controlled variation of refractive index along the tapered groove can be achieved by controlling a number of parameters such as:
  a) physical separation of droplets;
  b) refractive index difference between adjacent droplets;
  c) droplet size;
  d) diffusion time; and
  e) exposure duration.

The waveguide can then be cured by controlled exposure to UV light. Depending on the diffusion characteristics of the polymer, the curing process may take different forms. In some cases it may be appropriate to cure incrementally along the taper, in others to continually expose the whole region to low levels of UV light ensuring a slow curing process, allowing the correct diffusion time.

Referring again to FIG. 4, in this example, an ultraviolet radiation source 31 is included as part of the write head. This can serve to irradiate with UV radiation the deposited polymer as soon as desired after, during or before deposition onto the underlying structure. In other words, the UV source can be used to provide curing after dispensing from the appropriate nozzle head but before deposition on the underlying structure. By controlling the point in time during a droplet deposition cycle at which exposure is conducted, the manner in which the droplet settles on the underlying structure and in which it interacts with the structure and other droplets can be accurately controlled. For example, in one embodiment exposure occurs shortly after deposition such that the deposited polymer can be made tacky to limit diffusion to a desired degree.

Figure 8:
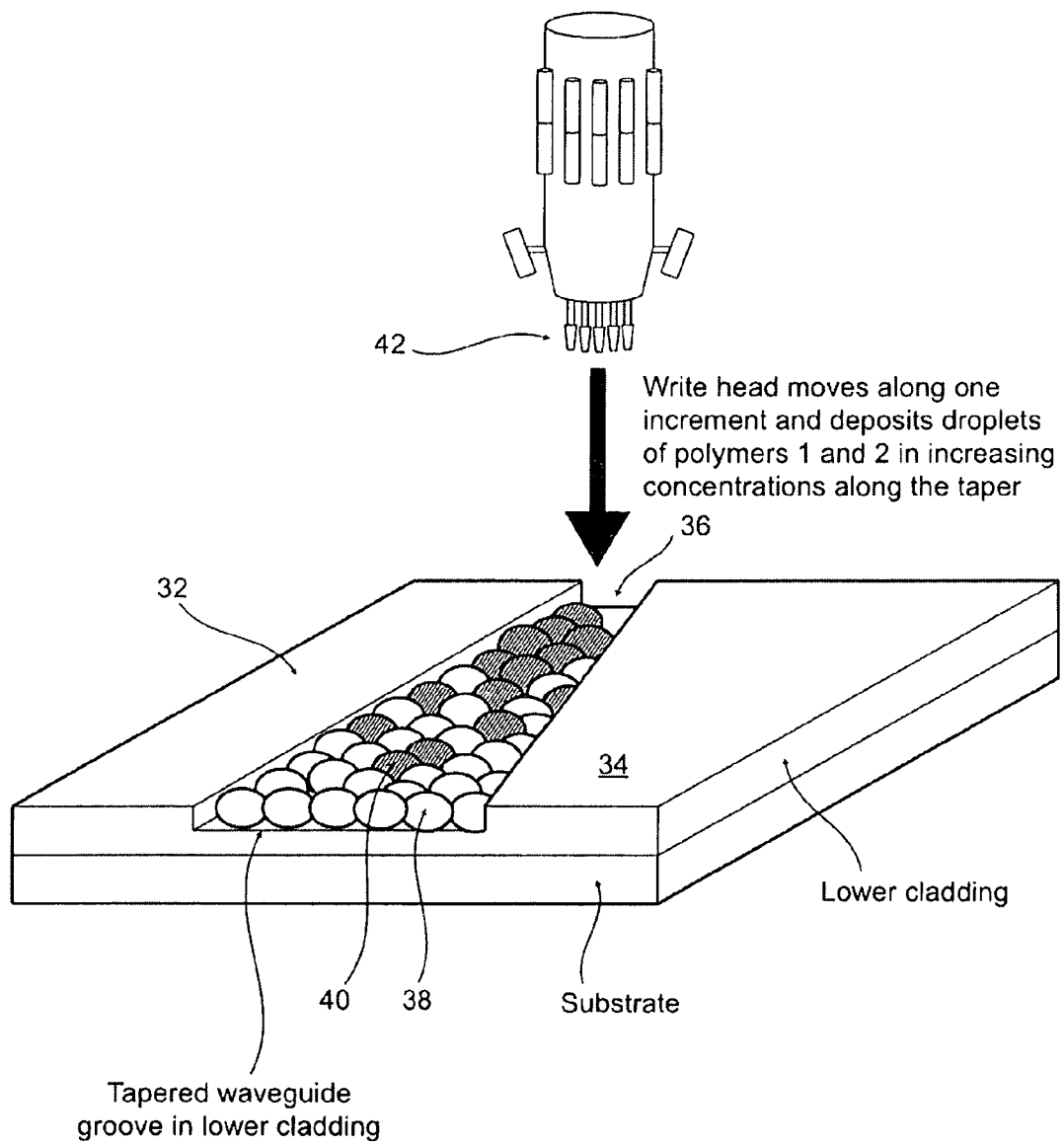
FIG. 8 is a schematic representation of a stage in the manufacture process of a tapered optical waveguide.
Figure 8A:
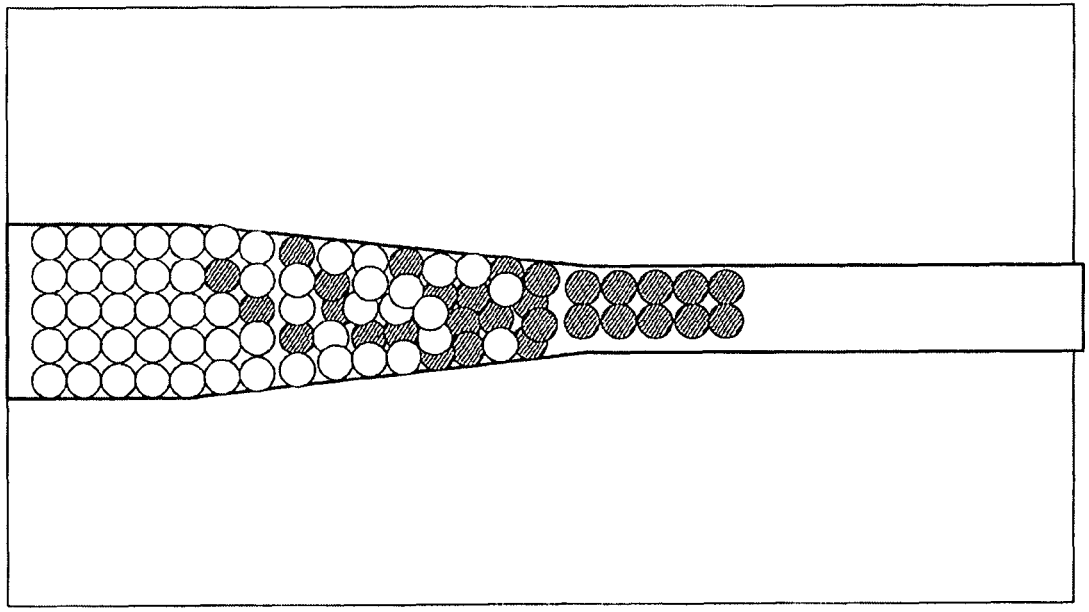
FIG. 8A is a plan view of a stage in the manufacture process of a tapered optical waveguide.

FIG. 8 shows a schematic representation of another method of manufacture of an optical waveguide. FIG. 8A shows a plan view of a channel within a lower cladding 34. The channel 32 has the shape of a tapered waveguide with a relatively thick input end and a relatively thin output end.

FIG. 8A shows the same basic structure in plan view. To make the tapered waveguide in such a way that the refractive index of the core varies along the length of the taper discrete units of optical core material 38 and 40 are deposited via a nozzle 41 (not shown in FIG. 8A). Preferably the nozzle 41 is the dispensing nozzle of an inkjet system.

As shown schematically in FIGS. 8 and 8A, there are two types 38 and 40 of core material that are deposited within the channel 32. The first type 38 represented as white circles are droplets of optical core material having a relatively low refractive index. In addition, the discrete units 40 represented as black circles correspond to discrete units of an optical core material having a relatively high refractive index. The aggregate refractive index of the waveguide is dependent on the proportion of high refractive index units 40 that are provided within a unit volume as compared to the proportion of low refractive index units 38 provided in the same unit. As the proportion increases, so does the aggregate refractive index. By varying the proportion of high to low refractive index units deposited within any given volume along the length of the waveguide or taper, variation of the refractive index of the waveguide along its length can be controlled as desired.

It is preferable that only two component core materials are used, one being of relatively high refractive index and one being of relatively low refractive index. By controlling the bulk refractive index using the proportion of high to low units used, it is possible to achieve a desired bulk refractive index profile along the length of the waveguide without requiring a larger number of different component optical core materials.

In the examples shown, there are only two components used although it might sometimes be preferable to use more than this while still using the overall method of varying the bulk refractive index by controlling the proportions of different refractive index units deposited in the channel 32.

Since the discrete units are small and in liquid form, once deposited, diffusion will occur such that the boundaries between individual units will not affect significantly the performance of the waveguide. In other words, although the variation of refractive index along the waveguide may not necessarily be completely smooth it will be sufficiently smooth so as to ensure that the waveguide functions as required.

In the example shown in FIG. 8, there may be only a single output nozzle which is in fluid communication with each of two sources (not shown). One of the sources is of the high refractive index material and the other is of the low refractive index material. In some examples it might be preferable to provide two separate nozzles, one for each of the sources. If a single nozzle is used, the small amount of mixing of residues in the nozzle prior to deposition will provide for good smoothing once the drop is deposited.

FIG. 9 shows a schematic representation of a dispensing unit for dispensing discrete units or a continuous stream of optical core material in the manufacture of a lossless tapered optical waveguide. Such apparatus is used in a method which may be referred to as an "intermix" method whereby polymer components are mixed in real time during or immediately prior to deposition.

The apparatus comprises plural polymer reservoirs $44_1$ to $44_n$ each in communication with a polymer intermix system 46. The intermix system is arranged to receive from each of the polymer reservoirs a controlled amount of material and to mix the received amounts for dispensing in a waveguide. A controller (not shown) is provided to control the provision of polymers from the reservoirs $44_1$ to $44_n$ to the intermix system 46.

A nozzle shaft 48 is provided for final mixing of the polymer components from the polymer reservoirs $44_1$ to $44_n$ to ensure that prior to deposition the refractive index is substantially constant within any small volume, i.e. where discrete units are deposited, the volume of each discrete unit deposited, even though clearly the refractive index is to vary along the length of the waveguide or taper when formed.

The system comprises a dispensing nozzle 50 through which the polymer mixture is dispensed. The proposed write head system allows for the deposition of material (in this case uncured liquid polymer) to be drawn from multiple sources and combined in a controlled manner in an intermix chamber (not shown). In a preferred embodiment, polymers of different refractive indices can be sourced and combined in tightly controlled proportions in real time such as to provide the ability to continuously vary the resultant refractive index of the output polymer.

When not used to deposit discrete units but instead used to deposit a continuous stream of optical material, the intermix system 46 and the nozzle shaft (or either in isolation) function to ensure that the refractive index of the stream of material being dispensed varies smoothly and uniformly within the stream at a rate required to achieve a desired refractive index profile of the lossless tapered waveguide being formed.

In the case of using the write head to fill grooves, the polymer deposition system is controlled in dependence on which part of the taper is being filled at any given point. The refractive index of the dispensed polymer is controllably adjusted in real time accordingly. In the case of cylindrical waveguides, the physical tapering may be achieved by the write head varying a number of parameters such as head speed, nozzle aperture diameter, viscosity (e.g. by varying UV exposure time). Again the polymer deposition system is controlled in dependence on the part of the waveguide or taper that is being created and the refractive index of the dispensed polymer is adjusted accordingly.

The refractive index of the core can thus be changed along the tapered region such that modal changes due to changes in core size are negated by those due to refractive index Δ changes. The mathematical relationship between core size and refractive index difference between core and cladding as it relates to the number of modes that can be supported by a given waveguide is well understood by those skilled in the art. Thus, it is possible to fabricate lossless tapered waveguides without loss of time or addition of cost.

One or more adjustable external radiation sources 52, such as ultraviolet lights is or are provided to irradiate the polymer stream as it leaves or discrete units as they leave the nozzle 50. In the examples shown, two UV sources are provided and they are directed to cure the material a short distance from the nozzle outlet 54. There is a zone 56 defined by the direction of transmission of the curing radiation, the position of which can be controlled by varying the angle at which the UV sources 52 direct their radiation. By controlling where the zone is or the angle of transmission of the radiation, the delay between expulsion of the polymer from the nozzle and its encountering the radiation can be varied.

It is preferable to have a greater number of UV radiation sources at different locations around the nozzle shaft as this provides greater control over the way in which the polymer stream is cured. The application of different strengths of UV light impinging the polymer stream from different directions is particularly useful in allowing the write head to compensate the curing pattern for changes in direction of movement or speed during writing.

If semi- or partial curing is desirable before the polymer stream (or units) makes (or make) contact with the substrate, as is required by the production of cylindrical waveguides, a UV curing chamber (not shown) is provided wherein the liquid polymer is exposed to controllable levels of UV light before it makes contact with the substrate.

FIG. 10 shows a schematic representation of a waveguide fabricating apparatus. In this example, a nozzle is provided together with a UV light source 52. Although a single UV light source 52 is shown, as explained above any number of external UV sources could be provided. The nozzle 50 is in communication with one or more sources of polymer for forming an optical core of a waveguide. The polymer sources are not shown.

In FIG. 11, the nozzle is activated to dispense a liquid polymer stream onto a lower cladding layer 54 on the substrate of an optical PCB. As the polymer is deposited on the lower cladding 54, i.e. as soon as it has made contact with the substrate or indeed before it has done so, it is exposed to radiation 56 from the UV source 52. Thus, the UV light source serves immediately at least to partially cure the polymer in a controlled fashion. This means that the deposited polymer is made tacky as soon as it leaves the nozzle or as soon as it contacts the upper surface of the lower cladding 54.

FIG. 13 shows the product of FIGS. 10 to 12 after a number of waveguide cores 55 have been deposited on the substrate 54. After this, as shown in FIG. 14 an upper cladding layer is provided over the cured or partially cured waveguide cores and this is exposed to UV radiation to cure the upper cladding.

The cross-sectional shape of the waveguides may be controlled e.g. by selecting an appropriately shaped output nozzle and/or by controlling the aperture of the output nozzle. In the example of FIG. 15, the waveguide cores 56 are substantially circular in cross-section. This can be achieved in real time by ensuring that the liquid polymer is cured as it leaves the nozzle so that it maintains the shape of the output orifice of the nozzle. Clearly, the degree to which the shape is maintained depends on the intensity of the radiation and various other controllable parameters during deposition.

In FIG. 16, an upper cladding is provided over the underlying structure including the lower cladding and the substantially circular cross-section waveguide cores. Although not shown as being tapered, it is preferred that parameters of the write head are controlled so as to form tapers. In one example, the output aperture of the nozzle is controllably variable, which facilitates formation of the taper in real time.

Thus, by using an apparatus and method as described with reference to FIGS. 9 to 16, it is possible to continually vary the refractive index of a waveguide along its length whilst still fabricating the waveguide in a quick and efficient manner. If the waveguide to be manufactured is tapered then this can be easily achieved by either, for example, depositing into a suitably shaped channel formed in a lower cladding layer or by varying parameters such as the speed of movement of the write head. If the head is moved more slowly then the amount of material deposited over a unit distance, so long as the output rate of the optical core material remains constant, will be increased. This can therefore lead easily to the formation of a taper in the structure of a waveguide.

Figure 17:
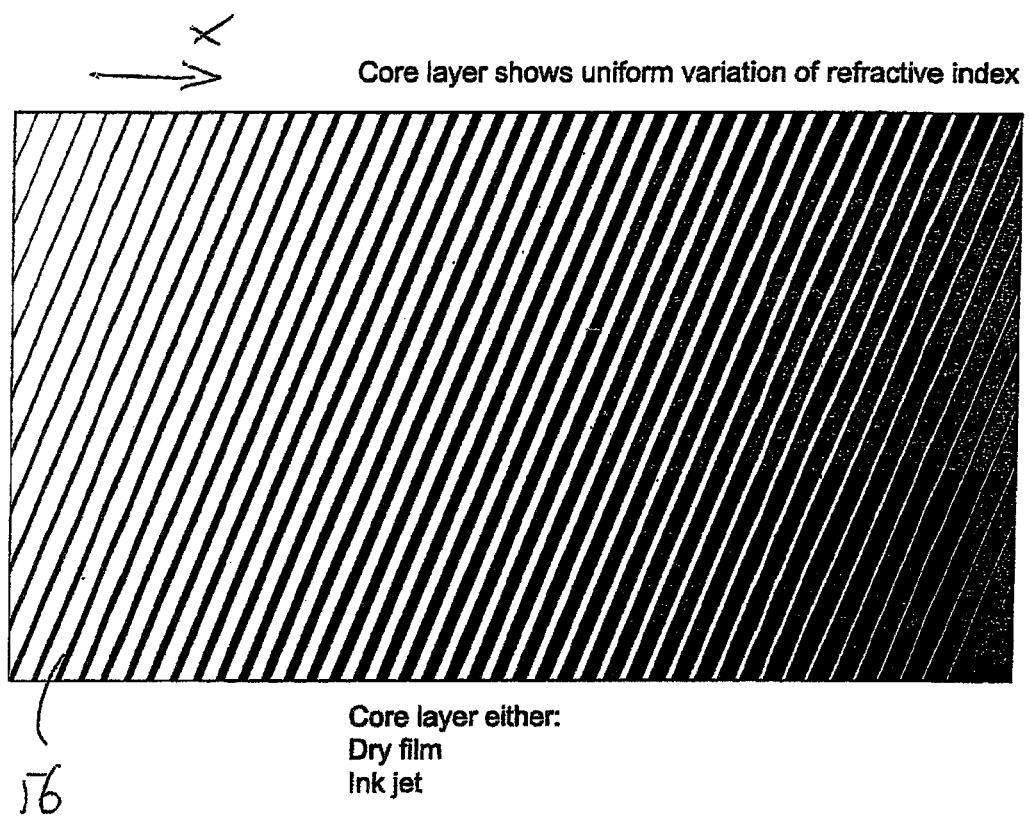

FIG. 17 shows a component used in the manufacture of a tapered optical waveguide having a varied refractive index along its length. The component is a uniform thickness layer 56 of optical core material. The core material has a varying refractive index along the direction indicated by the arrow X. The layer is formed as a uniform complete layer and therefore no complication arises due to patterning of the layer or the formation of the varying refractive index along the direction X. Once the layer is formed a selected region of the layer is maintained and another selected region removed so as to form a tapered waveguide. The layer may be formed using dry film printing or ink jet printing and is thus easily created.

Figure 18:
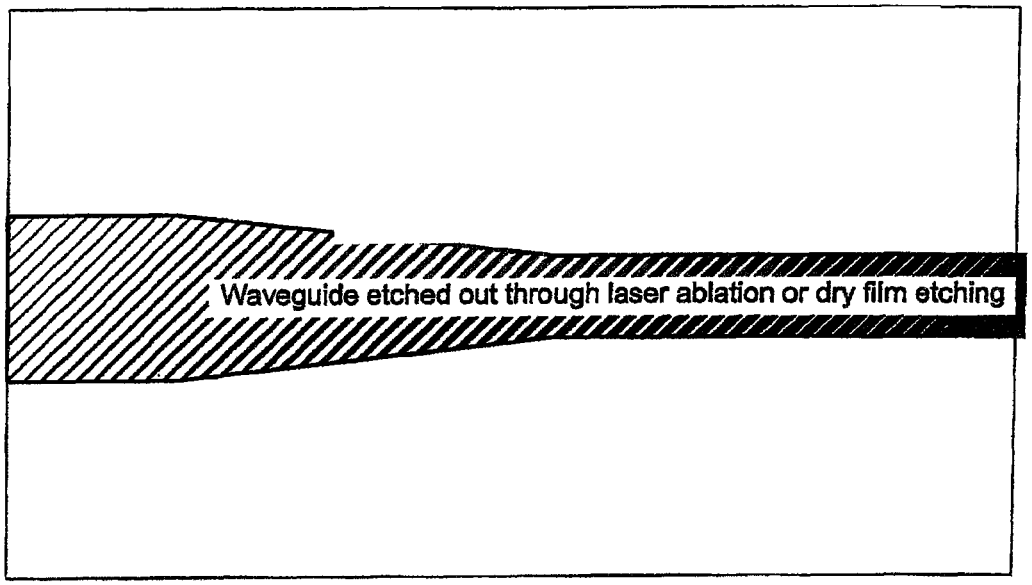

FIG. 18 shows an example of a waveguide formed from the layer 56 shown in FIG. 17. The waveguide is etched out through laser ablation or dry film etching or any other suitable means of patterning the dry layer 56 shown in FIG. 17. Thus, a simple and robust method is provided for the creation of a tapered optical waveguide in which the refractive index of the waveguide varies along its length so as to minimise modal expulsion. Cladding can be provided as required over the tapered waveguide core.

In an analogous method, a first layer is provided having a varying refractive index of opposite direction of variation as that shown in and described with reference to FIGS. 17 and 18. This layer is to be the lower cladding layer of a tapered optical waveguide. Once formed, a tapered waveguide core of uniform refractive index is formed thereon using any suitable method. An upper cladding of varying refractive index the same as the lower cladding is then provided over the resultant structure. The resultant waveguide then has a taper with a delta refractive index that varies along its length so as to minimise modal expulsion. Since the refractive index of the core remains constant the variation in cladding refractive index is selected so as to achieve the desired variation in delta refractive index along the length of the taper.

It will be appreciated that numerous modifications to and departures from the preferred embodiments described above will occur to those having skill in the art. Thus, it is intended that the present invention covers the modifications and variations of the invention, provided they come within that spirit and scope of the appended claims and their equivalents.

The invention claimed is:

1. A method of making a tapered waveguide, the method comprising:
    mixing two or more components of optical core material of different refractive indices to produce discrete units of optical core material having a refractive index dependent on the refractive indices of the two or more components, the proportions in which the two or more components are mixed, or a combination thereof; and depositing the discrete units of optical core material in a tapered groove of a lower cladding layer such that diffusion occurs between the discrete units to form a core of a tapered waveguide and the discrete units spread out to fill the tapered groove, the core having a refractive index dependent on the refractive indices of the discrete units and the core having a refractive index that varies along its length, the varying refractive index of the core along the tapered groove is controlled such that modal changes due to changes in the diameter of the core are negated by the change in refractive index.

2. A method according to claim 1, in which the discrete units of optical core material are liquid droplets of optical polymer material.

3. A method according to claim 2, in which the deposited discrete units of optical core material are left for a period of time prior to hardening so as to allow the diffusion between the discrete units to smooth out differences in refractive index at the boundaries of the discrete units.

4. A method according to claim 2 further comprising curing the droplets with curing radiation.

5. A method of making a waveguide, the method comprising:

providing a first source of a first optical core material having a relatively high refractive index and a second source of a second optical core material having a relatively low refractive index; and depositing discrete units of the first optical core material and discrete units of the second optical core material in a tapered groove of a cladding layer the discrete units spreading out to fill the tapered groove and the discrete units diffusing into each other at the boundaries thereof, where the number of discrete units of the first optical core material with respect to the number of discrete units of the second optical core material deposited along the pattern of the waveguide varies so that a refractive index of the waveguide varies along its length, the varying refractive index of the core along the tapered groove is controlled such that modal changes due to changes in the diameter of the core are negated by the change in refractive index.

6. A method according to claim 1, in which the average diameter of each discrete unit is at least an order of magnitude less than the width of the waveguide.

7. A method according to claim 1, further comprising providing an upper cladding on top of the core of the waveguide once formed.

8. A method of making a waveguide, the method comprising:

mixing two or more components of optical core material of different refractive indices to produce discrete units of optical core material having a refractive index dependent on the refractive indices of the components, the proportions in which the two or more components are mixed, or a combination thereof;

depositing on an optical cladding the discrete units of optical core material in a tapered groove of a cladding layer the discrete units spreading out to fill the tapered groove and the discrete units diffusing into each other at the boundaries thereof to form a core of a tapered waveguide, the tapered waveguide having a relatively thick end and a relatively narrow end, the core having a refractive index dependent on the refractive indices of the discrete units and the core having a refractive index that varies along its length, the varying refractive index of the core along the tapered groove is controlled such that modal changes due to changes in the diameter of the core are negated by the change in refractive index; and forming an upper cladding layer over the core of the waveguide.

9. A method according to claim 5, comprising mixing the desired proportions of the first and second optical material in a conduit between the first and second source and the point of deposition to achieve a desired refractive index for each of the discrete units.

10. A method according to claim 5, wherein a plurality of optical core materials are deposited as discrete units.

11. The method according to claim 1, wherein the varying refractive index of the core along the tapered groove is controlled by physical separation of the droplets, refractive index difference between adjacent droplets, droplet size, diffusion time, exposure duration, or combinations thereof.

12. The method according to claim 5, wherein the varying refractive index of the core along the tapered groove is controlled by physical separation of the droplets, refractive index difference between adjacent droplets, droplet size, diffusion time, exposure duration, or combinations thereof.

13. The method according to claim 8, wherein the varying refractive index of the core along the tapered groove is controlled by physical separation of the droplets, refractive index difference between adjacent droplets, droplet size, diffusion time, exposure duration, or combinations thereof.

* * * * *